United States Patent [19]

Shima et al.

[11] Patent Number: 4,493,042
[45] Date of Patent: Jan. 8, 1985

[54] BEARING FAILURE JUDGING APPARATUS

[75] Inventors: Ichiji Shima; Hiroshi Teshima, both of Kansai Electric Power Company Incorporated, Sohgo Gijyutsu Kenkyusho, No. 1,, Nakohji Ichinotsubo, Amagasaki-shi, Hyogo-Ken, Japan; Takayuki Koizumi; Teruo Usami, both of Amagasaki, Japan

[73] Assignees: Mitsubishi Denki Kabushiki Kaisha, Tokyo; Ichiji Shima; Hiroshi Teshima, both of Amagasaki, all of Japan

[21] Appl. No.: 350,249

[22] Filed: Feb. 19, 1982

Related U.S. Application Data

[63] Continuation-in-part of Ser. No. 119,201, Feb. 7, 1980, abandoned.

[30] Foreign Application Priority Data

Apr. 16, 1979 [JP] Japan .................................. 54-46427

[51] Int. Cl.³ .............................................. G06F 15/20
[52] U.S. Cl. ..................................... 364/507; 73/593; 364/552
[58] Field of Search ............... 364/507, 508, 552, 576, 364/485; 340/52 R, 52 A, 52 B, 65; 73/577, 587, 593

[56] References Cited

U.S. PATENT DOCUMENTS

| | | | |
|---|---|---|---|
| 3,694,637 | 9/1972 | Edwin et al. | 73/593 |
| 3,842,663 | 10/1974 | Harting et al. | 73/593 |
| 3,973,112 | 8/1976 | Sloane | 364/508 |
| 4,007,630 | 2/1977 | Noda | 73/593 |
| 4,165,458 | 8/1979 | Koizumi et al. | 377/191 |
| 4,196,629 | 4/1980 | Philips | 73/593 |
| 4,207,771 | 6/1980 | Carlos et al. | 73/587 |

FOREIGN PATENT DOCUMENTS 676897 7/1979 U.S.S.R. ............................. 73/593

OTHER PUBLICATIONS

"Denki Lakkai Zasshi", The Jnl. of the Electrical Engineers of Japan: vol. 99, No. 3, Mar. 1979; pp. 16-18.
"Development of Bearing Failure Detecting System for an Apparatus Such as a Motor"; Soken News, vol. 136; Feb. 10, 1979; Kansai Electric Power Co., Inc.
Gustafsson et al.; "Detection of Damage in Assembled Rolling Element Bearings"; Asle Transactions; vol. 5, No. 1; Apr. 1962; 73/593.
Philips; "A New Technology for Bearing Performance Monitoring"; U.S. Dept. of Commerce-NBS Publication; Dec. 1975, pp. 18-20, 23-27; 73/593.
Kaufman; "Measure Machinery Vibration-It can help you anticipate and prevent failures"-*Instr. & Control Systems;* Feb. 1975; pp. 59-62; 364/508.
Technical Literature; "Rolling Element Bearing Analyzer", Model BDI-100, Mechanical Technology Inc., Latham, New York.
"Diagnostic System for Ball Bearing Quality Control", Winn et al., Publication No. 760910, Society of Automotive Engineers, 1976.
Gupta et al., "Vibrational Characteristics of Ball Bearings", Mechanical Technology Inc., Latham, New York.

*Primary Examiner*—Errol A. Krass
*Attorney, Agent, or Firm*—Oblon, Fisher, Spivak, McClelland & Maier

[57] ABSTRACT

A bearing failure judging apparatus correctly judges the type of the cause of a failure of a bearing by synthetically judging many factors found in a vibrating waveform of a vibration produced when a failure takes place in the bearing i.e. various features of the time-waveform; a localization of the amplitudes of the time-waveform, the periods of pulsating waves, a degree of the acuteness of the waveform depicted by its envelope, the presence or absence of the proper peak value in the frequency spectra, and a change of the waveform after a given time.

6 Claims, 8 Drawing Figures (a)

(b)

(c)

(d)

BEARING FAILURE JUDGING APPARATUS

BACKGROUND OF THE INVENTION

1. Field of the Invention

The present invention relates to a bearing failure judging apparatus and more particularly, to an apparatus for judging the type of a failure occurring in a bearing.

2. Description of the Prior Art

A conventional apparatus is shown in block form in FIG. 1. A sensor/amplifier section (1) detects the vibration of a bearing (not shown) and amplifies the detected signal. The output signal from the sensor/amplifier section (1) is applied to an effective value detecting section (2) where the effective value of the output signal is detected and also to the peak value detecting section (3) where a peak value thereof is detected. The effective value detected is compared with a set value previously set in an effective value comparator (4) to judge whether the effective value is normal or not. Similarly, the peak value detected is compared with a set value previously set in a peak value comparator (5) to judge whether the peak value is normal or not. A judging section (6) judges on the basis of the results of the comparisons whether the bearing has failed. A display section (7) displays the result of the judgement by the judging section (6). When the judging apparatus described above determines that the bearing is abnormal, the judging apparatus encounters many problems in seeking what type of failure renders the bearing abnormal. The first problem is involved in the values obtained by the effective value and peak value detecting sections. Particularly the peak value varies largely with the frequency components of the waveform of the detected signal, possibly leading to an error of the peak value. The second problem is the erroneous operation of the judging apparatus. Generally, the bearing failure judging apparatus is with coupled to a dynamically operating equipment containing the bearing, so that pulsate waves occurring at the start and the stop of the equipment or disturbances caused during maintenance, drive the judging apparatus as if a failure is present in the bearing. The third problem is involved with the discriminating ability of the judging apparatus for discriminating the cause of the failure. There is a suggestion that the cause of the failure due to scars or other causes may be quantitatively judged on the basis of the ratio of the effective value to the peak value. The suggestion lacks a quantitative analysis and therefore the judgement thereby is frequently erroneous. In order to solve these problems, the following prior art (Japanese Patent Application No. 4531/1978) has been proposed and has solved some of the problems successfully. The prior art will be described in reference to FIG. 2. As shown, a sensor/amplifier section (1) is connected at the output to a low-pass filter (8) which is further connected at the output to an A/D converter (9). A control section (10) is connected to a memory section (11) and an arithmetic logic section (12) is connected at the output to a display section (7). In the device shown in FIG. 2 which is designed to the sense scars of a bearing, a signal wave is digitized by the A/D converter (9), controlled by the control section (10), loaded into or read out from the memory section (11), and applied to the arithmetic logic section (12) where it is subjected to a Fourier conversion to extract features of the sensed signal in the frequency domain. Through the processings, the kind and a degree of the scars occuring at the respective portions of the bearing are classified and analyzed and then displayed in the display section (7). The judging apparatus thus described provides very useful data of a specific failure, or the scar of the bearing.

SUMMARY OF THE INVENTION

Accordingly, an object of the present invention is to provide an apparatus which judges and displays the type of a cause of a failure occurring in a bearing before the failure develops to seize or destroy the bearing, thus possibly leading to disastrous accident.

Briefly, in the apparatus according to the invention, a detected signal wave detected from a bearing is lead to a time domain extracting means and a frequency domain extracting means in order to extract features of the detected signal wave in the time domain and features thereof in the frequency domain. Through the processings of those means, the type of the cause of a failure of the bearing is judged.

If necessary, the detected signal is amplified by amplifying means and the amplified signal is led through a low-pass filter to an A/D converter. The digital signal produced from the A/D converter is led to the time domain extracting means and the frequency domain extracting means.

Other objects and features of the invention will be apparent from the following description taken in connection with the accompanying drawings, in which:

BRIEF DESCRIPTION OF THE DRAWINGS

FIGS. 3(a)-3(d), shows graphs illustrating some combinations of the time waveforms and the related frequency spectra, which are peculiar to the types of the failures of the bearing, respectively;

DETAILED DESCRIPTION OF THE PREFERRED EMBODIMENTS

As is known, various types of failures occur in a bearing, each being attendant with a specific vibration. The vibration of the bearing with a failure will be described for each type of failure of before proceeding with description of the bearing failure judging apparatus of the present invention. Many experiments and the long experience of the inventors teach that most of failures of the bearing occurring in a normal use may be classified into the following three conditions:

(1) seizure coming from a lubricating oil shortage, (2) presence of foreign matters, and (3) scars marked on the respective portions of the bearing.

Figure 3:
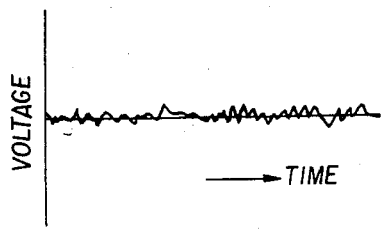
FIG. 3, comprising
Figure 3:
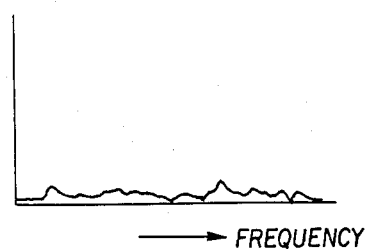
Figure 3:
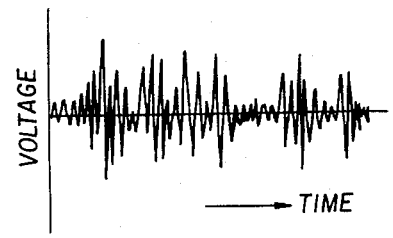
Figure 3:
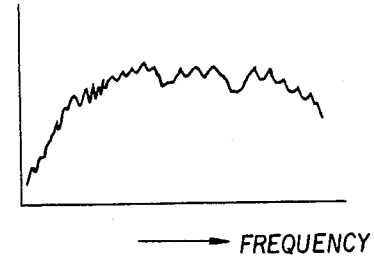
Figure 3:
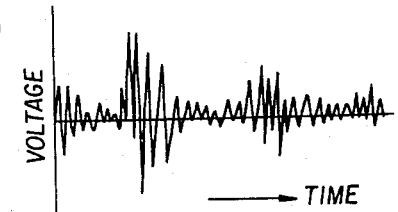
Figure 3:
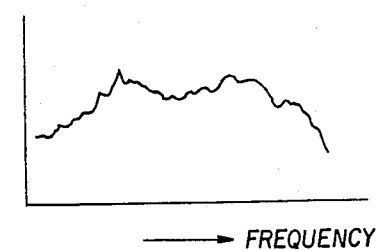
Figure 3:
Figure 3:
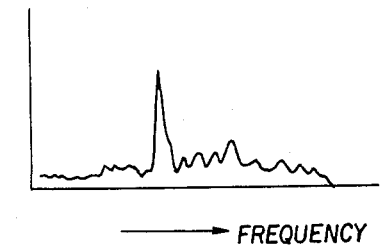

Typical time-waveforms and frequency spectra of these three kinds of failures will be illustrated on the left and right sides in FIG. 3. FIG. 3(a) illustrates a vibration acceleration waveform and a frequency spectrum when a bearing is normal. As seen, the output voltage of the time-waveform is small and the level of the frequency spectrum is low. FIG. 3(b) shows an output voltage when there is shortage of an oil. A seizure due to a slight shortage of oil causes a great voltage change, say, 3 to 5 times that of the normal output voltage. The frequency spectrum in this case is analogous to that obtained as the result of the analysis of white noise. FIG. 3(c) illustrates the condition when foreign matter is mixed into the lubricating oil. In this case, foreign matter put between the rolling surface and the balls, produce pulsate waveforms. The pulsate waves are random in the amplitudes and the intervals of their occurrences. The frequency spectrum takes an indefinite shape due to the pulsate waves and the irregular waveform follwoing the pulsate wave, similar to the case of an oil shortage. FIG. 3(d) shows a waveform and a frequency spectrum when the bearing is scarred. As shown, pulsate waves occure at fixed periods and substantially fixed amplitude. The pulsate waves induce a resonant vibration in the portion marked with the scar of the bearing, so that marked proper peaks appear in the frequency spectrum. An additional feature of the time-waveform is a localization of the amplitudes of the wave. The cause of the localization is unapparent, however, it is estimated that the localization arises from a nonlinearity characteristic of the vibration system. This phenomenon of the localization is observed very frequently in rolling bearings.

An embodiment of the invention was made on the basis of findings described above.

Figure 1:
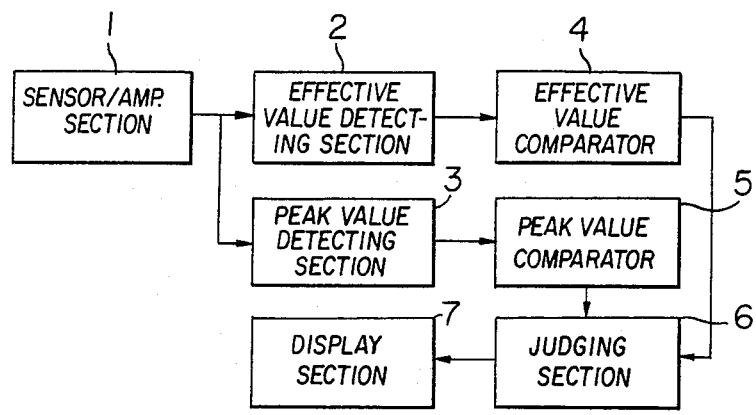
FIG. 1 shows a block diagram of a conventional failure judging apparatus.
Figure 2:
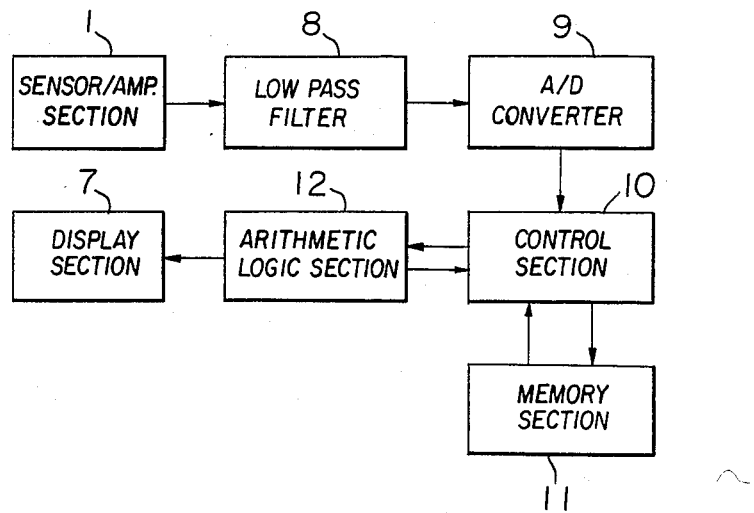
FIG. 2 shows a block diagram of a judging apparatus for judging scars of a rolling bearing, which was proposed for solving the problems involved in the apparatus shown in FIG. 1.
Figure 4:
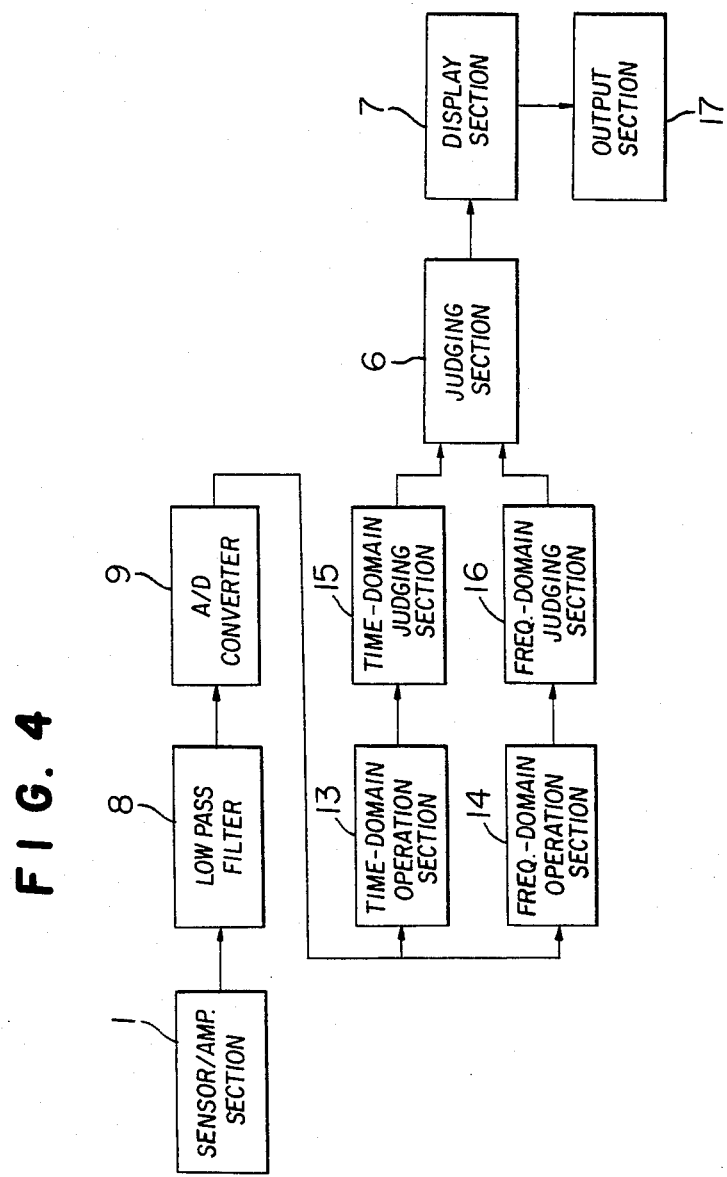
FIG. 4 shows a block diagram of an embodiment of a bearing failure judging apparatus according to the invention.
Figure 5:
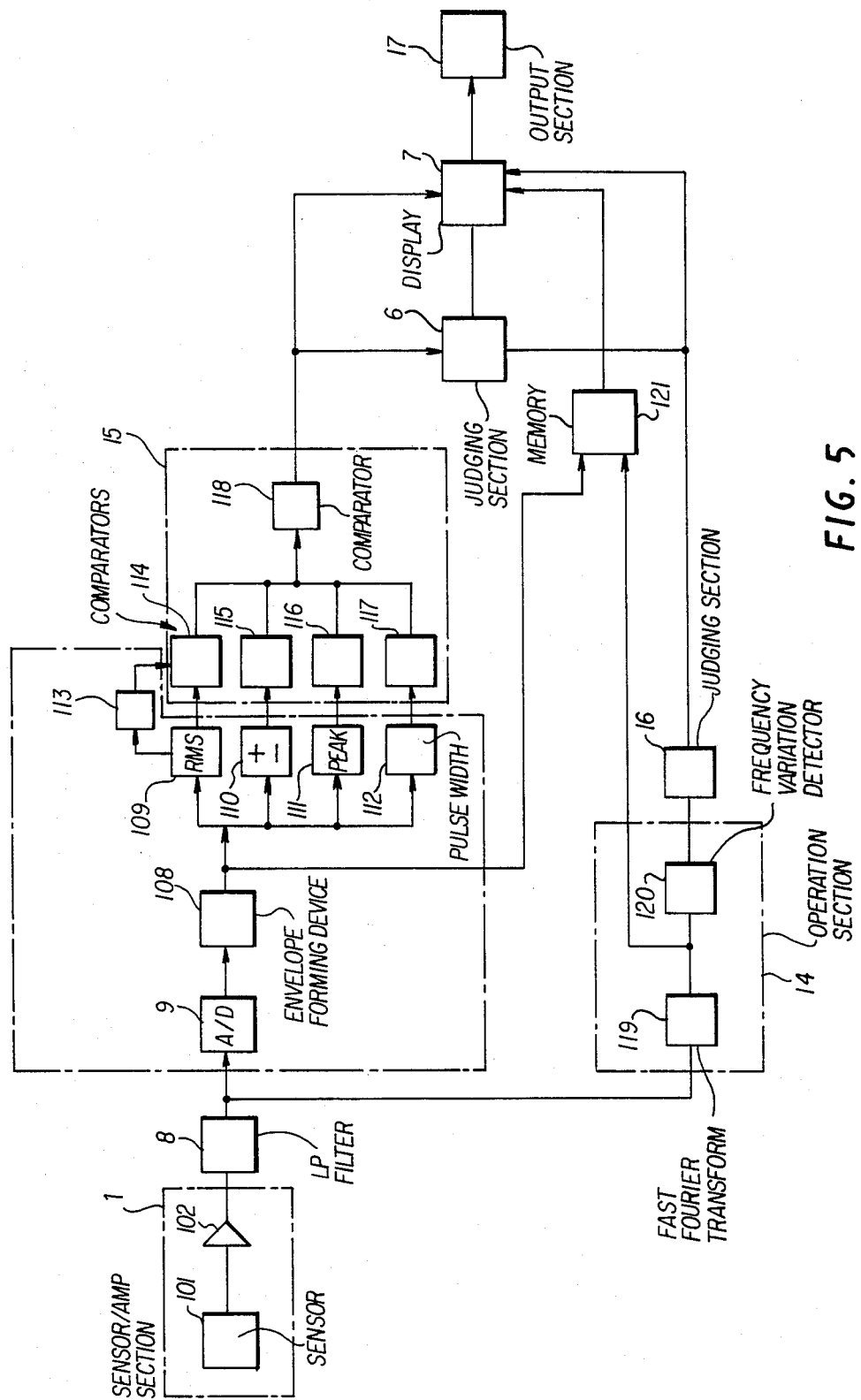
FIG. 5 shows a block diagram of an embodiment of a bearing failure judging apparatus according to the invention.

Referring now to FIG. 4 and FIG. 5, there is shown a failure judging apparatus according to the present invention. As shown, a sensor/amplifier section (1) consisting of a sensor (101) and an amplifier (102) with the same construction as that of FIG. 1 is connected at the output to an A/D converter (9) by way of a low-pass filter (8). The output of the A/D converter (9) is coupled with a time-domain operation section (13) and a frequency-domain operation section (14).

The time-domain operation section (13) comprises a memory (121) for memorizing waveform; an envelope forming device (108); RMS detector (109) for outputs of the envelope forming device (108); a detector (110) for detecting localization to +side or −side to zero level; an envelope peak detector (111); an impulse wave width detector (112); and a memory (113) for memorizing the value of (109).

The time-domain judging section (15) comprises comparators (114), (115), (116), (117) which respectively correspond to the devices (109), (110), (111) and (112) and a comparator (118) which determines, in total, the results of the comparators (114), (115), (116) and (117).

The frequency domain operation section (14) comprises a fast Fourier converter (119); a frequency variation detector (120) which detects variation of the output of (119) and the waveform memory (121).

Further, the time-domain section (13) is coupled at the output with a time-domain judging section (15) and the frequency-domain section (14) with a frequency-domain section (16). A judging section (6), receiving the output signals from those judging sections (15) and (16), is provided as a subsequent stage. A display section (7) provided following the judging section (6) displays the type of failure. At the output side of the display section (7), an output section (17) is further provided to transmit a signal to a bearing failure-restoring direction unit (not shown) to direct one to restore the failed bearing.

The operation of the bearing failure judging apparatus as described above will be described. A vibration occurring in the bearing is sensed and amplified by the sensor/amplifier section (1) and the sensed and amplified signal representing the vibration is fed into the low-pass filter (8) to prevent errors and then is inputted into the A/D converter (9) where it is converted from the analog form into digital form. The speed of the A/D conversion is limited by the upper limit of the frequency of the vibration occurring in the bearing to be judged, usually 20,000 per second. The number of conversion of a train of Generally the one defined by $2^n$ under consideration of the operation algorithm of the fast Fourier conversion used when the frequency spectrum is obtained, the number of quantitized signals is generally the one defined by $2^n$; usually $n=8$ to 10, say, 256 to 1024. The first step of the processings in the time domain operation section (15) and the judging section is to obtain an envelope of the waveform. The envelope may be obtained merely by connecting the positive and negative peaks of the waveform by the envelope forming device (108), for example, since the waveform is already quantitized. Let us express generally the envelope function as $E(i\Delta t)$ where $\Delta t$ is the interval of the time waveform and the envelope on the positive side is $E^+(i\Delta t)$ and that on the negative side is $E^-(i\Delta t)$ where $i=0$ to $N$ and $N=10^n$. Then, let us extract the feature of the time waveform by using the general envelope expression $E(i\Delta t)$. Firstly, whether or not some failure takes place in the bearing may be checked by using, for example, a bearing failure alarm device to warn that there is a high possibility that some failure is now occurring in the bearing. This also may be vertified by the amplitude of $E(i\Delta t)$ detected by the detector (111). When a reference value in a normal state or previously set by the comparator (116), $[E(i\Delta t)]s$, satisfies the following relations, it is considered that a failure takes place in the bearing.

$$E^+(i\Delta t) \geq [E^+(i\Delta t)]s$$

$$E^-(i\Delta t) \leq [E^-(i\Delta t)]s$$

Following this, to classify the cause of the failure into types, the thickness of the time waveform detected by the width detector (112) is investigated by using the envelope function. The accumulated value of the envelope function is defined as follows:

$$Q^+ = \sum_{i=0}^{N-1} E^+(i\Delta t)$$

$$Q^- = \sum_{i=0}^{N-1} E^-(i\Delta t)$$

Then the following expression is calculated.

$$Q = Q^+ - Q^-$$

By comparing the Q which is set by the comparator (117) and is obtained with the set value Qs, we can know the cause of the failure of the bearing: when $Q \geq Qs$, the cause is a shortage of the lubricating oil or mixing of foreign substances into the lubricating oil; when $Q < Qs$, the causes is scars marked on the bearing. Thirdly, the period of peaks appearing found in the envelope function is obtained. The period T is given $$T \sim T_s \quad (4)$$

where Ts is a fixed value defined by the size of the bearing. When T approximates Ts, there is a possibility that the scar is marked somewhere on the bearing. Then, in order to determine by the localization detector (110) where the pulsate peaks are localized, the following relation is investigated about the peak values in the envelope function:

$$|E^+(p\Delta t)/E^-(p\Delta t)| \geqq S \quad (5)$$

where P=the value of i when peaks appear in the envelope function and S=a set value of the comparator (115)~1.5.

If the equation (5) is satisfied, a possibility that the bearing is scarred increases.

The processing in the frequency-domain operation section (14) and the frequency-domain judging section (16) are performed according to the following equations (6) and (7) by the fast Fourier converter (119). The original waveform is quantitized as x(iΔt) and then the following expression is operated:

$$X(k\Delta f) = \Delta t \sum_{i=0}^{N-1} \times (i\Delta t) \exp(-j2\pi k\Delta f i\Delta t) \quad (6)$$

where
X(kΔf)=Fourier conversion of x(iΔt)
f=divided frequency intervals of Fourier spectrum obtained
k=0 to N−1
j=√−1

Following this operation, the power spectrum of P(kΔf) expressed by the following equation (7) is operated to obtain the frequency spectrum.

$$P(k\Delta f) = X(k\Delta f) \cdot X^*(k\Delta f) \quad (7)$$

where
P(kΔf)=the power spectrum of X(kΔf)
X*(kΔf)=the conjugate complex number of X(kΔf).
The operation of the expression (6) may easily be performed for a short time by using the algorithm of the usual fast Fourier conversion. The frequency spectrum obtained is investigated to determine if there is a peak in a specific frequency or not and whether a level is large or not over a wide frequency range the frequency variation detector (120). The result of the investigation is classified into two cases: (1) scars of the bearing, (2) the mixing of foreign substances into the lubricating oil or a shortage of oil. The judging section receives all the results of those operations and properly weights the result of the judgement, thereby to provide the synthetic judgement by the comparator (6). If the cause of the failure is the shortage of the oil or the mixing of foreign substances, a sequence of those processings are performed once and then the same sequence is repeated after a given time. For example, when an increase of the envelope function, more or simply an increase of the effective value of the time waveform is large, in comparison of the present effective value detected by the effective value RMS detector (109) with effective values memorized in the memory (113) before certain times, the failure is determined to be a mixing of foreign substances. Conversely, when it is small, the cause of the failure is a shortage of oil. Depending on the number of the bearings to be examined, the given time is usually 30 minutes to one hour. In this case, the rate of increase of the effective value when foreign substances are mixed into the lubricating oil is 7 to 10 times, compared to the effective value when the bearing is normal. However, in the case of oil shortage, the rate of increase is 2 to 3 times at most.

The operations and judgement processes of the signal quantitized are executed by using a microprocessor. The use of the microprocessor is considered to be most suitable for these processings in the light of the cost, the use condition and the flexibility in the application of the microprocessor. The display section reports the result of the judgement to an operator or monitor personel while at the same time it applies the outputs to the output section.

Each of the above noted components above discussed in connection with the disclosure of FIG. 5, as well as the other FIGUREs, are readily available in the marketplace. By way of examples only, memory 121 can be implemented by any available memory such as ROM or RAM manufactured by MELCO, in particular type M5L2716K, M5L 2732K, etc. Memory 113 can likewise be constructed using conventional memory circuits. Comparators 114–118 can be implemented of any of commercially available microprocessors, such as the 8085 type microprocessor. Fast Fourier converter 119 can be constructed using conventional Fast Fourier conversion algorithms, as for example disclosed in Cochran et al, "What is the Fast Fourier Transformer", IEEE Trans. on Audio and Electroacoustics, Vol. AV-15, No. 2, June, 1967, pp. 45–55.

In the above-mentioned embodiment, a vibration is used as a signal to extract a failure, however, any other suitable medium to report a failure of the bearing may be used. For example, an acoustic signal may be very effective to sense the failure of the bearing. In this case, the sensor is a microphone.

We claim:

1. A bearing failure judging apparatus comprising:
sensing means for sensing a signal produced from a bearing and producing a sensed signal output;
time domain extracting means for extracting features in the time domain of said sensed signal output from said sensing means and producing an output signal;
frequency domain extracting means for extracting features in the frequency domain of said sensed signal output and producing an output signal; and
judging means for judging the type of a failure occurring in the bearing on the basis of said output signal from said time domain extracting means and said output signal from said frequency domain extracting means,
wherein said judging means determines the type of failure to be scars when a repetitive period of pulsate waves appearing in said sensed signal output in the time domain is fixed, when there is a localization in the amplitudes of the pulsate waves, and when a frequency peak perculiar to the bearing member appears in the spectrum in the frequency domain of said sensed signal output.

2. A bearing failure judging apparatus comprising:
sensing means for sensing a signal produced from a bearing and producing a sensed signal output;
time domain extracting means for extracting features in the time domain of said sensed signal output from said sensing means and producing an output signal;

frequency domain extracting means for extracting features in the frequency domain of said sensed signal output and producing an output signal; and judging means for judging the type of a failure occurring in the bearing on the basis of said output signal from said time domain extracting means and said output signal from said frequency domain extracting means;

wherein said judging means determines the type of failure to be one of a shortage of oil and foreign substances mixed in the oil when a repetitive period of pulsate waves of said sensed signal output in the time domain is irregular, when the lasting time of the pulsate waves is relatively longer than that of a normal bearing signal and the acuteness of a waveform defined by a waveform envelope in the time domain decreases, and when a proper peak is not present in the spectra over a predetermined frequency range and spectra are distributed over a predetermined range.

3. A bearing failure judging apparatus comprising:

sensing means for sensing a signal produced from a bearing and producing a sensed signal output;

amplifying means for amplifying said sensed signal output from said sensing means and having an output;

a low-pass filter connected to the output of said amplifying means and having an output;

an analog to digital converter connected to the output of the said low-pass filter for converting an analog signal derived from said low-pass filter into a digital output signal;

time domain extracting means for extracting features in the time domain of the digital output signal from said analog to digital converter and producing an output signal;

frequency domain extracting means for extracting features in the frequency domain of said sensed signal output and producing an output signal; and judging means for judging the type of a failure occurring in the bearing on the basis of said output signal from said time domain extracting means and said output signal from said frequency domain extracting means;

wherein said judging means determines the type of failure to be scars when a repetitive period of pulsate waves appearing in said sensed signal output in the time domain is fixed, when there is a localization in the amplitudes of the pulsate waves, and when a frequency peak peculiar to the bearing member appears in the spectrum in the frequency domain of said sensed signal output.

4. A bearing failure judging apparatus comprising:

sensing means for sensing a signal produced from a bearing and producing a sensed signal output;

amplifying means for amplifying said sensed signal output from said sensing means and having an output;

a low-pass filter connected to the output of said amplifying means and having an output;

an analog to digital converter connected to the output of the said low-pass filter for converting an analog signal derived from said low-pass filter into a digital output signal;

time domain extracting means for extracting features in the time domain of the digital output signal from said analog to digital converter and producing an output signal;

frequency domain extracting means for extracting features in the frequency domain of said sensed signal output and producing an output signal; and judging means for judging the type of a failure occurring in the bearing on the basis of said output signal from said time domain extracting means and said output signal from said frequency domain extracting means;

wherein said judging means determines the type of failure to be one of a shortage of oil and foreign substances mixed in the oil when a repetitive period of pulsate waves of said sensed signal output in the time domain is irregular, when the lasting time of the pulsate waves is relatively longer than that of a normal bearing signal and the acuteness of a waveform defined by a waveform envelope in the time domain decreases, and when a proper peak is not present in the spectra over a predetermined frequency range and spectra are distributed over a predetermined range.

5. A bearing failure judging apparatus according to claims 4 or 2, wherein said judging means comprises:

means for detecting and storing successive effective (RMS) values of a vibrating signal from the bearing when it is determined that the type of failure is one of a shortage of oil and foreign substances mixed in the oil;

means for forming a ratio of successive of said effective (RMS) values; and means for comparing the ratio with a predetermined value, wherein when the ratio obtained exceeds the predetermined value, it is judged that foreign substances are mixed in the oil.

6. A bearing failure judging apparatus according to claims 1, 3, 4 or 2 wherein said signal produced from a bearing is an acoustic signal.

* * * * *